US009612121B2

(12) United States Patent
Beermann et al.

(10) Patent No.: US 9,612,121 B2
(45) Date of Patent: Apr. 4, 2017

(54) LOCATING POSITION WITHIN ENCLOSURE

(71) Applicant: Microsoft Technology Licensing, LLC, Redmond, WA (US)

(72) Inventors: Mattias Beermann, Hagersten (SE); John Ian Ferrell, Bellevue, WA (US); Edward Un, Beijing (CN); Kai Wang, Beijing (CN); Jun Zhao, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 164 days.

(21) Appl. No.: 13/706,621

(22) Filed: Dec. 6, 2012

(65) Prior Publication Data

US 2014/0163864 A1   Jun. 12, 2014

(51) Int. Cl.
*G01C 21/20* (2006.01)
*G01S 19/51* (2010.01)
*G01S 19/48* (2010.01)

(52) U.S. Cl.
CPC .......... *G01C 21/206* (2013.01); *G01S 19/48* (2013.01); *G01S 19/51* (2013.01)

(58) Field of Classification Search
CPC ....... G01C 21/206; G01C 21/20; G06F 17/00; G06F 19/00
USPC ................................................. 701/400–541
See application file for complete search history.

(56) References Cited

U.S. PATENT DOCUMENTS

| 5,054,111 | A |   | 10/1991 | Goodwin |         |
|-----------|---|---|---------|---------|---------|
| 5,270,936 | A | * | 12/1993 | Fukushima et al. | 701/487 |
| 5,526,357 | A |   | 6/1996  | Jandrell |        |
| 6,029,070 | A |   | 2/2000  | Kingdon et al. | |
| 6,046,698 | A |   | 4/2000  | Pandey  |         |
| 6,088,588 | A |   | 7/2000  | Osborne |         |

(Continued)

FOREIGN PATENT DOCUMENTS

| EP | 2360605    | 8/2011 |
| KR | 20090059920 | 6/2009 |
| WO | 2011071199 | 6/2011 |

OTHER PUBLICATIONS

"Geodesy", Jun. 21, 2004, Wikipedia, <http://en.wikipedia.org/wiki/Geodesy>.*

(Continued)

*Primary Examiner* — Genna Mott (57) ABSTRACT

Among other things, one or more techniques and/or systems are provided for locating a position within an enclosure. In one example, known global coordinates (e.g., GPS coordinates of latitude/longitude) associated with the position within the enclosure may be transformed into local coordinates (e.g., x/y coordinates) for the position. The local coordinates may be used for tracking a location of the position within the enclosure. In another example, known local coordinates of the position within the enclosure may be transformed into global coordinates for the position, which may be used for tracking a location of the position within the enclosure. In another example, a blueprint image of the enclosure may be used to track a location of the position within the enclosure. In this way, location tracking may be provided for objects within indoor spaces (e.g., a mapping application may track a current position of a mobile device within a building).

16 Claims, 7 Drawing Sheets

(56) References Cited

U.S. PATENT DOCUMENTS

| | | |
|---|---|---|
| 6,212,405 B1 | 4/2001 | Jiang et al. |
| 6,246,861 B1 | 6/2001 | Messier et al. |
| 6,249,252 B1 | 6/2001 | Dupray |
| 6,674,403 B2 | 1/2004 | Gray et al. |
| 6,782,256 B2 | 8/2004 | Engholm et al. |
| 6,782,351 B2 | 8/2004 | Reichel et al. |
| 6,850,502 B1 | 2/2005 | Kagan et al. |
| 6,957,067 B1 | 10/2005 | Iyer et al. |
| 6,990,428 B1 | 1/2006 | Kaiser et al. |
| 7,000,015 B2 | 2/2006 | Moore et al. |
| 7,030,811 B2 | 4/2006 | Goren et al. |
| 7,035,652 B1 | 4/2006 | Kelkar |
| 7,099,673 B2 | 8/2006 | Yamashita |
| 7,110,779 B2 | 9/2006 | Billhartz et al. |
| 7,113,794 B2 | 9/2006 | Annamalai |
| 7,120,420 B2 | 10/2006 | Karaoguz et al. |
| 7,136,638 B2 | 11/2006 | Wacker et al. |
| 7,146,134 B2 | 12/2006 | Moon et al. |
| 7,212,821 B2 | 5/2007 | Laroia et |
| 7,236,460 B2 | 6/2007 | Wu et al. |
| 7,260,408 B2 | 8/2007 | Friday |
| 7,286,515 B2 | 10/2007 | Olson et al. |
| 7,286,835 B1 | 10/2007 | Dietrich |
| 7,295,524 B1 | 11/2007 | Gray et al. |
| 7,307,820 B2 | 12/2007 | Henson et al. |
| 7,312,752 B2 | 12/2007 | Smith et al. |
| 7,317,419 B2 | 1/2008 | Sugar et al. |
| 7,319,877 B2 | 1/2008 | Krumm et al. |
| 7,324,545 B2 | 1/2008 | Chuah et al. |
| 7,333,800 B1 | 2/2008 | Gopinath |
| 7,339,914 B2 | 3/2008 | Bhagwat et al. |
| 7,349,702 B2 | 3/2008 | Graumann |
| 7,433,696 B2 | 10/2008 | Dietrich |
| 7,437,127 B2 | 10/2008 | Goren et al. |
| 7,489,661 B2 | 2/2009 | Hills et al. |
| 7,516,049 B2 | 4/2009 | Zill et al. |
| 7,532,896 B2 | 5/2009 | Friday |
| 7,590,720 B2 | 9/2009 | Bahl |
| 7,603,710 B2 | 10/2009 | Harvey et al. |
| 7,751,829 B2 | 7/2010 | Masuoka et al. |
| 7,769,396 B2 | 8/2010 | Alizadeh-Shabdiz et al. |
| 7,818,017 B2 | 10/2010 | Alizadeh-Shabdiz et al. |
| 7,822,564 B2 | 10/2010 | Davis et al. |
| 8,031,120 B2 | 10/2011 | Smith et al. |
| 8,060,018 B2 | 11/2011 | Davis et al. |
| 8,077,090 B1 | 12/2011 | Chintalapudi et al. |
| 8,095,139 B2 | 1/2012 | Marinier |
| 8,130,103 B2 | 3/2012 | Huang |
| 8,155,662 B2 | 4/2012 | Zill et al. |
| 8,194,567 B2 | 6/2012 | Erwin et al. |
| 8,200,251 B2 | 6/2012 | Huang |
| 8,204,512 B2 | 6/2012 | Dietrich |
| 8,548,493 B2 | 10/2013 | Rieger |
| 8,554,226 B2 | 10/2013 | Laroia et al. |
| 8,559,975 B2 | 10/2013 | Lin et al. |
| 8,626,073 B2 | 1/2014 | Ruuska |
| 8,862,067 B2 | 10/2014 | Un et al. |
| 8,933,841 B2 | 1/2015 | Valaee |
| 8,965,403 B2 | 2/2015 | Rieger |
| 8,983,490 B2 | 3/2015 | Un et al. |
| 9,279,878 B2 | 3/2016 | Un et al. |
| 2001/0022558 A1 | 9/2001 | Karr et al. |
| 2002/0002504 A1 | 1/2002 | Engel et al. |
| 2003/0135762 A1 | 7/2003 | Macaulay |
| 2004/0085909 A1 | 5/2004 | Soliman |
| 2004/0095880 A1 | 5/2004 | Laroia |
| 2004/0198234 A1 | 10/2004 | Wacker et al. |
| 2005/0054350 A1 | 3/2005 | Zegelin |
| 2005/0058151 A1 | 3/2005 | Yeh |
| 2005/0070279 A1 | 3/2005 | Ginzburg et al. |
| 2005/0124344 A1 | 6/2005 | Laroia et al. |
| 2005/0124345 A1 | 6/2005 | Larola |
| 2005/0136845 A1 | 6/2005 | Masuoka et al. |
| 2005/0169185 A1 | 8/2005 | Qiu et al. |
| 2005/0185618 A1 | 8/2005 | Friday |
| 2005/0190732 A1 | 9/2005 | Douglas et al. |
| 2005/0201300 A1 | 9/2005 | Bridgelall |
| 2005/0208952 A1 | 9/2005 | Dietrich et al. |
| 2005/0246334 A1 | 11/2005 | Tao et al. |
| 2005/0254474 A1 | 11/2005 | Iyer et al. |
| 2005/0261004 A1 | 11/2005 | Dietrich |
| 2005/0276276 A1 | 12/2005 | Davis |
| 2005/0281363 A1 | 12/2005 | Qi et al. |
| 2005/0286440 A1 | 12/2005 | Strutt et al. |
| 2006/0036406 A1 | 2/2006 | Skidmore et al. |
| 2006/0067283 A1 | 3/2006 | So et al. |
| 2006/0068769 A1 | 3/2006 | Adya et al. |
| 2006/0071780 A1 | 4/2006 | McFarland |
| 2006/0075131 A1 | 4/2006 | Douglas et al. |
| 2006/0199546 A1 | 9/2006 | Durgin |
| 2006/0199558 A1 | 9/2006 | Chiodini et al. |
| 2006/0217062 A1 | 9/2006 | Saffre et al. |
| 2006/0224730 A1 | 10/2006 | Fok et al. |
| 2006/0239202 A1 | 10/2006 | Kyperountas et al. |
| 2006/0240840 A1 | 10/2006 | Morgan et al. |
| 2006/0268906 A1 | 11/2006 | Kneckt |
| 2006/0270400 A1 | 11/2006 | DaSilva et al. |
| 2007/0004394 A1 | 1/2007 | Chu et al. |
| 2007/0008925 A1 | 1/2007 | Dravida et al. |
| 2007/0060067 A1 | 3/2007 | Ruuska |
| 2007/0139269 A1 | 6/2007 | Chen et al. |
| 2007/0176782 A1 | 8/2007 | Mohalik |
| 2007/0258421 A1 | 11/2007 | Alizadeh-Shabdiz |
| 2007/0281714 A1 | 12/2007 | Douglas et al. |
| 2008/0004042 A1 | 1/2008 | Dietrich et al. |
| 2008/0008159 A1 | 1/2008 | Bourlas et al. |
| 2008/0068981 A1 | 3/2008 | Marinier |
| 2008/0139217 A1 | 6/2008 | Alizadeh-Shabdiz et al. |
| 2008/0161011 A1 | 7/2008 | Babin |
| 2008/0188242 A1 | 8/2008 | Carlson et al. |
| 2008/0198948 A1 | 8/2008 | Tang |
| 2008/0200181 A1 | 8/2008 | Zill et al. |
| 2008/0227463 A1 | 9/2008 | Hizume et al. |
| 2008/0228437 A1* | 9/2008 | Damarla .............. G01S 5/0221 702/151 |
| 2008/0252527 A1 | 10/2008 | Garcia |
| 2009/0028120 A1 | 1/2009 | Lee |
| 2009/0093956 A1 | 4/2009 | Wu et al. |
| 2009/0247186 A1 | 10/2009 | Ji et al. |
| 2009/0286548 A1 | 11/2009 | Coronel et al. |
| 2010/0066559 A1 | 3/2010 | Judelson |
| 2010/0073235 A1 | 3/2010 | Smith et al. |
| 2010/0097982 A1 | 4/2010 | Eichenberger et al. |
| 2010/0134288 A1 | 6/2010 | Huang |
| 2011/0029370 A1 | 2/2011 | Roeding |
| 2011/0060807 A1 | 3/2011 | Martin et al. |
| 2011/0099142 A1 | 4/2011 | Karjalainen |
| 2011/0178708 A1* | 7/2011 | Zhang .................. G01C 21/165 701/501 |
| 2011/0179027 A1 | 7/2011 | Das et al. |
| 2011/0182238 A1 | 7/2011 | Marshall et al. |
| 2011/0184945 A1* | 7/2011 | Das et al. ................... 707/724 |
| 2011/0304503 A1 | 12/2011 | Chintalapudi et al. |
| 2011/0306375 A1 | 12/2011 | Chandra et al. |
| 2011/0320539 A1 | 12/2011 | Zhao et al. |
| 2012/0072100 A1* | 3/2012 | Mate et al. .................. 701/300 |
| 2012/0081250 A1 | 4/2012 | Farrokhi et al. |
| 2012/0110635 A1 | 5/2012 | Harvey et al. |
| 2012/0122475 A1 | 5/2012 | Ahmed et al. |
| 2012/0135777 A1 | 5/2012 | Karpoor et al. |
| 2012/0139790 A1 | 6/2012 | Wirola et al. |
| 2012/0196621 A1 | 8/2012 | Alizadeh-Shabdiz et al. |
| 2012/0220310 A1 | 8/2012 | Gogic et al. |
| 2012/0264447 A1 | 10/2012 | Rieger |
| 2012/0310746 A1 | 12/2012 | Zhao et al. |
| 2013/0023282 A1 | 1/2013 | Lin et al. |
| 2013/0079027 A1 | 3/2013 | Hand et al. |
| 2013/0166202 A1* | 6/2013 | Bandyopadhyay et al. .. 701/501 |
| 2013/0217332 A1 | 8/2013 | Altman et al. |
| 2013/0252631 A1 | 9/2013 | Alizadeh-Shabdiz et al. |
| 2013/0260693 A1 | 10/2013 | Un et al. |
| 2013/0260781 A1 | 10/2013 | Un et al. |
| 2013/0336138 A1 | 12/2013 | Venkatraman et al. |

(56) References Cited

U.S. PATENT DOCUMENTS

| | | |
|---|---|---|
| 2014/0011518 A1 | 1/2014 | Valaee et al. |
| 2014/0111380 A1 | 4/2014 | Gibbs et al. |
| 2015/0031392 A1 | 1/2015 | Un et al. |

OTHER PUBLICATIONS

"Chord (geometry)", Nov. 17, 2007, Wikipedia, <<http://en.wikipedia.org/wiki/Chord_(geometry)>>.*

Maling, D.H., Coordinate Systems and Maps Projections, 2nd ed., Pergamon Press, 1992. Chapter 2.*

Woyke, Elizabeth, "Microsoft, Motorola, Nokia and RIM to Battle Google over Indoor Location Market", Retrieved at <<http://forbes.com/sites/elizabethwoyke/2011/12/22/microsoft-motorola-nokia-and-rim-to-battle-google-over-indoor-location-market/>>, Dec. 22, 2011, pp. 5.

Kim, Ryan, "Geoloqi targets developers of location-based services", Retrieved at <<http://gigaom.com/mobile/geoloqi-helps-location-based-services-take-flight/>>, Feb. 23, 2012, pp. 11.

"Location Based Services the Focus of Windows Phone 8, iOS 6 and Android 41 Jelly Bean", Retrieved at <<http://www.navibiz.com.cn/e/Manufacturer/mf-115-01.html>>, Jul. 20, 2012, p. 1.

Verbree, et al., "Positioning LBS to the third dimension", Retrieved at <<http://www.gdmc.nl/zlatanova/thesis/html/refer/ps/Positioning%20LBS%20to%20the%20third%20dimension.pdf>>, Retrieved Date: Aug. 28, 2012, pp. 12.

Knippers, R., "Coordinate systems", Retrieved at <<http://plone.itc.nl/geometrics/Coordinate%20systems/coordsys.html>>, Aug. 2009, p. 1.

Wartell, et al., "Precision Markup Modeling and Display in a Global Geospatial Environment", Retrieved at <<http://smartech.gatech.ed/jspui/bitstream/1853/3235/1/03-23.pdf>>, vol. 5097 Geo-Spatial and Temporal Image and Data Exploitation III, Apr. 21, 2003, pp. 9.

Zuendt, et al., "Integration of Indoor Positioning into a Global Location Platform", Retrieved at <<http://www.wpnc.net/fileadmin/WPNC04/Proceedings/Integration_of_Indoor_Positioning_into_a_Global_Location_Platform.pdf>>, // www.wpnc.net/fileadmin/WPNC04/Proceedings/Integration_of_Indoor_Positioning_into_a_Global_Location_Platform.pdf, Mar. 26, 2004, pp. 6.

Int. Search Report cited in PCT Application No. PCT/US2013/072892 dated Apr. 3, 2014, 14 pgs.

"Interactive Annotation on Mobile Phones for Real and Virtual Space Registration", Hyejin Kim, Gerhard Reitmayr and Woontack Woo, Oct. 26, 2011, IEEE International Symposium on Mixed and Augmented Reality 1022 Science and Technology Proceedings, pp. 265-266.

PCT Second Written Opinion in PCT/US2013/072892, mailed Feb. 9, 2015, 9 pages.

PCT International Preliminary Report on Patentabiltiy in PCT/US2013/072892, mailed May 7, 2015, 10 pages.

Songmin Jia et al: "LRF-based data processing algorithm for map building of mobile robot", Information and Automation (ICIA), 2010 IEEE International Conference on, IEEE, Piscataway, NJ, USA, Jun. 20, 2010 (Jun. 20, 2010), pp. 1924-1929, XP031709609, ISBN: 978-1-4244-5701-4.

PCT Corrected International Preliminary Report on Patentabiltiy in PCT/US2013/072892, mailed Jun. 2, 2015, 10 pages.

U.S. Appl. No. 10/962,383, Office Action mailed Aug. 11, 2007, 15 pages.

U.S. Appl. No. 10/962,383, Office Action mailed Sep. 4, 2008, 15 pages.

U.S. Appl. No. 10/962,383, Office Action mailed Apr. 16, 2009, 18 pages.

U.S. Appl. No. 10/962,383, Office Action mailed Jan. 5, 2010, 19 pages.

U.S. Appl. No. 10/962,383, Office Action mailed Aug. 9, 2010, 20 pages.

U.S. Appl. No. 10/962,383, Office Action mailed Jun. 6, 2011, 20 pages.

U.S. Appl. No. 10/962,383, Office Action mailed Dec. 20, 2011, 23 pages.

U.S. Appl. No. 10/962,383, Amendment and Response filed May, 8, 2008, 11 pages.

U.S. Appl. No. 10/962,383, Amendment and Response filed Jan. 29, 2009, 9 pages.

U.S. Appl. No. 10/962,383, Amendment and Response filed Sep. 15, 2009, 9 pages.

U.S. Appl. No. 10/962,383, Amendment and Response filed Jul. 2, 2010, 10 pages.

U.S. Appl. No. 10/962,383, Amendment and Response filed Dec. 15, 2010, 10 pages.

U.S. Appl. No. 10/962,383, Amendment and Response filed Sep. 15, 2011, 10 pages.

U.S. Appl. No. 10/962,383, Amendment and Response filed Mar. 20, 2012, 9 pages.

U.S. Appl. No. 10/962,383, Notice of Allowance mailed Mar. 29, 2012, 5 pages.

Yan, et al., "In-Store Shopping Activity Modeling Based on Dynamic Bayesian Networks", Retrived at http://www.indiana.edu/-wits2009/Session2b.pdf», Proceedings of 19th Workshop on Information Technologies and Systems, Dec. 14, 2009, pp. 55-60.

Barsocchi, et al., "A Novel Approach to Indoor RSSI Localization by Automatic Calibration of the Wireless Propagation Model", Retrieved at http://ieeexplore.ieee.org/stamp/stamp.jsp?tp~&amumbeF5073315>>, Proceedings of69th Vehicular Technology Conference, Apr. 26, 2009, pp. 1-5.

Krumm, et al., "Locadio: Inferring Motion and Location from Wi-Fi Signal Strengths", Retrived at <<http://research.microsoft.corn/en-us/urn/people/horvitz/locadio.pdf», Proceedings of First Annual International Conference on Mobile and Ubiquitous Systems: Networking and Services, Aug. 22, 2004, pp. 10.

U.S. Appl. No. 13/431,331, Office Action mailed Feb. 14, 2014, 8 pages.

U.S. Appl. No. 13/431,331, Amendment and Response filed May 14, 2014, 10 pages.

U.S. Appl. No. 13/431,331, Notice of Allowance mailed Jun. 9, 2014, 11 pages.

U.S. Appl. No. 14/513,165, Office Action mailed Sep. 10, 2015, 19 pages.

U.S. Appl. No. 14/513,165, Office Action mailed Apr. 4, 2016, 21 pages.

U.S. Appl. No. 14/513,165, Amendment and Response filed Oct. 12, 2015, 12 pages.

U.S. Appl. No. 14/513,165, Notice of Allowance mailed Jan. 14, 2016, 14 pages.

PCT International Search Report in PCT/US2013/029735, mailed May 31, 2012, 8 pages.

Bose, et al., "A Practical Path Loss Model for Indoor WiFi Positioning Enhancement", Retrieved at <<http://ieeexplore.ieee.org/ielx5/4446227 /4449533/044497 I 7.pdf?tp~&arnumbeF44497 I 7&isnumbeF4449533>>, 6th International Conference on Information, Communications & Signal Processing, Dec. 10, 2007, pp. 1-5.

Bshara, et al. "Localization in WiMAX Networks Based on Signal Strength Observations", Retrieved at <<http://www.ieee-globecom.org/2008/downloads/DD/DD I 6W2%20Localization/DD16W2%20Bshara%20M/WiMAX_RSS-oc_IEEE.pdf>>, 2008, pp. 5.

"Location Tracking Approaches", Retrieved at <<http://www.cisco.com/en/US/docs/solutions/Enterprise/Mobility/wifich2.htrnl>>, Retrieved Date: Dec. 23, 2012, pp. 8.

Seidel, et al., "914 MHz Path Loss Prediction Models for Indoor Wireless Communications in Multifloored Buildings", Published Date: Feb. 1992, Proceedings: IEEE Transactions on Antennas and Propagation, pp. 207-217 http://ieeexplore.ieee.org/stamp/stamp.jsp?tp~&amumbeF127405.

Tsuchiya, et al., "Localization Algorithms for Distributed Platformamong Vehicles"-Published Date: Oct. 12, 2009, Proceedings:Intemational Conference on Ultra Modern Telecommunications & Workshops, 2009 (ICUMT '09), pp. 1-6, http://ieeexplore.ieee.org/ stamp/ stamp.j sp?tp~&arnumbeF534 5615.

(56) References Cited

OTHER PUBLICATIONS

Chintalapudi, et al., "Indoor Localization without the Pain"-Published Date: Sep. 20, 2010 Proceedings: Proceedings of the Sixteenth Annual International Conference on Mobile Computing and Networking (MobiCom' 10), http://research.microsoft.com/pubs/135721/ez-mobicom.pdf.

Ji, et al., "Ariadne: A Dynamic Indoor Signal Map Construction and Localization System"-Published Date: Jun. 19, 2006, Proceedings: Proceedings of the 4th international conference on Mobile systems, applications and services (MobiSys '06), pp. 151-164, http://www.usenix.org/events/mobisys06/full_papers/p 151-ji.pdf.

Wang, et al., "Residual Ranking: A Robust Access-Point Selection Strategy for Indoor Location Tracking"-Published Date: Oct. 11, 2009, Proceedings: IEEE International Conference on Systems, Man and Cybernetics, 2009. (SMC 2009), pp. 5035-5040, http://ieeexplore.ieee.org/stamp/stamp.j sp?tp~&arnumbeF534604 I.

Borrich, et al., "Alternatives for Indoor Location Estimation on Uncoordinated Environments"-Published Date: Sep. 2, 2011, Proceedings: IEEE 13th International Conference on High Performance Computing and Communications (HPCC), 2011, pp. 971-976, http:/Iieeexplore.ieee.org/stamp/stampj sp?arnumbeF06063 I 08.

U.S. Appl. No. 13/431,497, Office Action dated Dec. 15, 2014, 13 pages.

U.S. Appl. No. 13/431,444, Office Action mailed Jul. 8, 2014, 15 pages.

U.S. Appl. No. 13/431,444, Amendment and Response filed Oct. 8, 2014, 10 pages.

U.S. Appl. No. 13/431,444, Notice of Allowance mailed Nov. 6, 2014, 17 pages.

EP Communication in Application 13815224.4, mailed Jul. 14, 2015, 2 pages.

U.S. Appl. 14/513,165, Notice of Withrawal from Issuance mailed Feb. 3, 2016, 2 pages.

U.S. Appl. No. 13/431,497, Office Action mailed Dec. 15, 2014, 13 pages.

U.S. Appl. No. 13/431,497, Office Action mailed Apr. 16, 2015, 16 pages.

U.S. Appl. No. 13/431,497, Amendment and Response filed Mar. 16, 2015, 13 pages.

U.S. Appl. No. 13/431,497, Amendment and Response filed Oct. 15, 2015, 12 pages.

U.S. Appl. No. 13/431,497, Notice of Allowance mailed Oct. 29, 2015, 8 pages.

U.S. Appl. No. 11/753,536, Office Action mailed Dec. 31, 2009, 15 pages.

U.S. Appl. No. 11/753,536, Office Action mailed May 10, 2010, 14 pages.

U.S. Appl. No. 11/753,536, Amendment and Response filed Jan. 19, 2010, 21 pages.

U.S. Appl. No. 11/753,536, Amendment and Response filed Jul. 1, 2010, 24 pages.

U.S. Appl. No. 11/753,536, Notice of Allowance mailed Dec. 29, 2011, 8 pages.

Layland, "Understanding Wi-Fi Performance," Business Communication Review, Mar. 2004, pp. 34-37.

Muthukrishnan, et al., "Flavour-Friendly Location-aware Conference Aid with Privacy Observant ArchitectURe" available at least as early as <<Jan. 9, 2007>>, at <<http://wwwhome.cs.utwente.nl-muthukrishnank/papers/00000136.pdf, at pp. 1-12.

Muthukrishnan, et al., "Towards Smart Surroundings: Enabling Techniques and Technologies for Localization", available at least as early as <<Jan. 9, 2007>>, at <<http://wwwes.cs.utwente.nl/smartsurroundings/publications/Muthukrishnan05b.pdf, 2007, pp. 13.

Wang, et al., "Solutions to Performance Problems in VoIP Over a 802.11 Wireless LAN," IEEE Transactions on Vehicular Technology, vol. 54, No. 1, Jan. 2005, pp. 366-384.

Xylomenos, et al., "TCP Performance Issues over Wireless Links," IEEE Communications Magazine, Apr. 2001, pp. 52-58. Yang, et al., "Web Browsing Performance of Wireless Thin-client Computing," Twelfth International World Wide Web Conference (WWW2003), 2003, pp. 1-12.

Yang, et al., "Web Browsing Performance of Wireless Thin-client Computing," Twelfth International World Wide Web conference (WWW2003), 2003, pp. 1-12.

Bahl, et al., "Enhancing the Security of Corporate Wi-Fi Networks Using DAIR", Mobile Systems, applications and services, 2006, pp. 1-14.

Bulusu, et al., "Self-Configuring Localization Systems: Design and Experimental Evaluation", ACM Transactions on Embedded Computing Systems (TECS), Feb. 2004, vol. 3, No. 1, 34 pgs.

Patwari, et al., "Locating Nodes: Cooperative Localization in Wireless Sensor Networks", IEEE Signal Processing Magazine, vol. 22, No. 4, Jul. 2005, pp. 54-69.

PCT Intl Search Report and Written Opinion for Application No. PCT/US2008/054333, dated Aug. 14, 2008, 9 pgs.

Savvides, et al., "A Self-Configuring Location Discovery System for Smart Environments", Workshop for pervasive computing and networking, 2005, 12 pgs.

Chinese Office Action in Application 200880005280.8, mailed Jun. 22, 2011, 9 pages.

Extended European Search Report mailed Nov. 25, 2011 for European patent application No. 08730192.5, 13 pages.

U.S. Appl. No. 12/815,973, Office Action mailed Oct. 14, 2010, 12 pages.

U.S. Appl. No. 12/815,973, Office Action mailed Jan. 27, 2011, 14 pages.

U.S. Appl. No. 12/815,973, Office Action mailed May 10, 2011, 11 pages.

U.S. Appl. No. 12/815,973, Amendment and Response filed Jan. 13, 2011, 14 pages.

U.S. Appl. No. 12/815,973, Office Action mailed Apr. 13, 2011, 20 pages.

U.S. Appl. No. 12/815,973, Office Action mailed Aug. 10, 2011, 17 pages.

U.S. Appl. No. 12/815,973, Notice of Allowance mailed Sep. 8, 2011, 7 pages.

Barsocchi, et al., "A Novel Approach to Indoor RSSI Localization by Automatic Calibration of the Wireless Propagation Model", Retrieved at http://wnlab.isti.cnr.it/paolo/papersNTC09-localization.pdf», IEEE 69th Vehicular Technology Conference, Apr. 26-29, 2009, pp. 5.

Barsocchi, et al.,"Virtual Calibration for RSSI-based Indoor Localization with IEEE 802.15.4", << http://ieeexplore.ieee.org/stamp/stamp.jsp?tp~&amumbeF5199566 >>, IEEE International Conference on Communications, 2009, Jun. 14-18, 2009, pp. 5.

Braga De Faria, Daniel, "Scalable Location-Based Security in Wireless Networks", Retrieved at << http://www-cs-students.stanford.edu/-dbfaria/files/faria-dissertation.pdf >>, Stanford University, Dec. 2006, pp. 183

Bahl, et al., "DAIR: A Framework for Managing Enterprise Wireless Networks Using Desktop Infrastructure", Retrieved at<< http://research.microsoft.com/en-us/um/people/padhye/publications/hotnets-2005.pdf >>,In Proceedings of the Annual ACM Workshop on Hot Topics in Networks (HotNets), Nov. 15, 2005, pp. 1-6.

Bahl, et al.,"RADAR:An Inbuilding RF-Based User Location and Tracking System", Retrieved at << http://www-robotics.usc.edu/gaurav/CS599-IES/StudentPres/19.ppt >>, INFOCOM 2000. Nineteenth Annual Joint Conference of the IEEE Computer and Communications Societies. Proceedings. IEEE, vol. 2, Mar. 26-30, 2000, pp. 24.

Want, et al., "The Active Badge Location System", Retrieved at<<http://web.media.mit.edu/-dmerrill/badge/Want92_ActiveBadge. pdf>>, ACM Transactions on Information Systems (TOIS), vol. 10, No. 1, Jan. 1992, pp. 10.

Guha, et al., "Sextant: A Unified Node and Event Localization Framework Using Non-Convex Constraints", Retrieved at<< http://www.cs.cornell.edu/People/egs/papers/sextant.pdf>>, Proceedings of the 6th ACM International symposium on Mobile ad hoc networking and computing, May 25-27, 2005, pp. 12.

(56) References Cited

OTHER PUBLICATIONS

Haeberlen, et al., "Practical Robust Localization Over Large-Scale 802.11 Wireless Networks", Retrieved at<< http://.citeseerx.ist.psu.edu/viewdoc/download?doi~IO.I.80.69578,rep~repI&type~pdf >>,Proceedings of the 10th annual International conference on Mobile computing and networking, Sep. 26-Oct. 1, 2004, pp. 15.
Ji, et al., "Ariadne: A Dynamic Indoor Signal Map Construction and Localization System", Retrieved at << http://www.usenix.org/events/mobisys06/full_papers/pl51-ji.pdf>>, Proceedings of the 4th international conference on Mobile systems, applications and services, Jun. 19-22, 2006, pp. 151-164.
Bulusu, et al., "GPS-Less Low Cost Outdoor Localization for Very Small Devices", Retrieved at << http://www.isi.edu/-ohnh/PAPERS/ BulusuOO.a.pdf>>, IEEE Personal Communications Magazine, vol. 7, No. 5, Oct. 2000, pp. 1-7.
Kirkpatrick, et al., "Optimization by Simulated Annealing", Retrieved at<<http://www.fisica.uniud.it/-ercolessi/MC/kgvl983.pdf>>, Science, vol. 220. No. 4598, May 13, 1983, pp. 10.
Krumm, et al., "The NearMe Wireless Proximity Server", Retrieved at http://research.microsoft.com/ en-us/um/people/kenh/papers/nearme.pdf, In Proceedings ofUbicomp: Ubiquitous Computing, Sep. 25-27, 2000, pp. 283-300.
La Marca, et al., "Place Lab: Device Positioning Using Radio Beacons in the Wild", Retrieved at<<http://www.placelab.org/publications/ pubs/pervasive-placelab-2005-final.pdf>>, In Proceedings of the Third International Conference on Pervasive Computing, May 8-13, 2005, pp. 18.
Peng, et al., "Demo Abstract: A Beepbeep Ranging System on Mobile Phones", Retrieved at << http://research.microsoft.com/pubs/77330/demo_sensys07 beepbeep.pdf >>, Sensys'07 Best Demo Award, Nov. 2007, pp. 2.
Priyantha, et al., "The Cricket Location-Support System", Retrieved at << http://graphics.stanford.edu/courses/cs428-03-spring/Papers/readings/Location/Balakrishnan_cricket_mobicomOO.pdf >>, 6th ACM International Conference on Mobile Computing and Networking (ACM MOBICOM), Aug. 6-11, 2000, pp. 12.
Suli, et al., "An Introduction to Numerical Analysis", Retrieved at<<http://assets.cambridge.org/97805218/10265/frontmatter/9780521810265_frontrnatter.pdf >>, University Press, Cambridge, 2003, pp. 10.
Azizyan, et al., "SurroundSense: Mobile Phone Localization via Ambience Fingerprinting", Retrieved at<< http://synrg.ee.duke.edu/ papers/surroundsense.pdf, In MobiCom, Sep. 20-25, 2009, pp. 12.
Gwon, et al., "Error Characteristics and Calibration-Free Techniques for Wireless LAN-Based Location Estimation", Retrieved at <<http://www.gurulib.com/ user_manual_file/pic_1209049296984.pdf>>, in Mobiwac, Oct. 1, 2004, pp. 2-9.
Ferris, et al, "WiFi-SLAM Using Gaussian Process Latent Variable Models", Retrieved at << http://www.cs.washington.edu/ai/Mobile_Robotics/postscripts/gplvm-wifi-slam-ijcai-07.pdf, In JCAI, Jan. 6-12, 2007, pp. 6.
Capkun, et al., "GPS-free Positioning in Mobile Ad-Hoc Networks", Retrieved at http://pi4.informatik.uni-mannheim.de/-haensel/ sensometze/Capkun.pdf>>, in HICSS, Jan. 3-6, 2001, pp. 1-15.
Yang, et al., "Beyond Trilateration: On the Localizability of WirelessAd-Hoc Networks", Retrieved at<< http://www.di.unito.it/-matteo/I09/DATA09/0I-69-0I.PDF », InInfoCom,Apr.19-25, 2009,pp. 9.Youssef, et al., "The Horus WLAN Location Determination System",Retrieved at << http://www.cs.umd.edu/-moustafa/papers/horus_usenix.pdf>>, in MobiSys, Jun. 6-8, 2005, pp. 14.
Ward, et al., "A New Location Technique for the Active Office", Retrieved at<<http://www.google.co.in/url?sa~t&source~web&cd~1 &ved~OCBgQFjAA&ur!~http%3 A %2F%2F citeseerx.ist.psu.edu%2Fviewdoc%2Fdownload%3Fdoi%3DI0.I.I.93.I 624%26rep%3Drep 1 %26type%3 Opdf&rct~j&q~A+new+location+technique+for+the+active+office.&ei-DSAbTNvoKYj80wSk8MSBCQ&usg~AFQjCNFXPxCyFdkpDIIgp6J8xfjiM_4e06w >>, IEEE Per.
Varshaysky, et al., "GSM Indoor Localization", <<Retrieved at http://citeseerx.ist.psu.edu/viewdoc/download?doi~10.1.1.128.7286&rep~repI&type~pdf >>, Pervasive and Mobile Computing Journal, Elsevier, vol. 3, No. 6, 2007, pp. 24.
Savvides, et al., "Dynamic Fine-Grained Localization in Ad-Hoc Networks of Sensors", Retrieved at<<http://citeseerx.ist.psu.edu/viewdoc/download?doi~IO.I.I.95.3217&rep~repI&type~pdf >>, in MobiCom, Jul. 16-21, 2001, pp. 1-14.
Lim, et al., "Zero Configuration Robust Indoor Localization: Theory and Experimentation", Retrieved at<<http://swing.cs.uiuc.edu/papers/ INFOCOM06LOC.pdf, in Infocom, Apr. 23-29, 2006, pp. 12.
U.S. Appl. No. 13/154,220, Amendment and Response filed Oct. 22, 2013, 12 pages.
U.S. Appl. No. 13/154,220, Amendment and Response filed Apr. 1, 2013, 16 pages.
U.S. Appl. No. 13/154,220, Amendment and Response filed Apr. 10, 2013, 15 pages.
U.S. Appl. No. 13/154,220, Office Action mailed Apr. 14, 2016, 22 pages.
Leonard, et al., "Simulatanoues Map Building and Localization for an Autonomous Mobile Robot", Retrieved at<<http://cmI.mit.edu/jleonard/ pubs/Idw _iros_I99 I. pdf>>, in IROS,1991, pp. 1442-1447.
Ni, et al., "LANDMARC: Indoor Location Sensing Using Active RFID", Retrieved at << http://www.angoya.net/Ini/papers/MyPapers/NLLP03.pdf, In WINET, 2004, pp. 9.
Niculescu, et al., "Ad-Hoc Position System", Retrieved at<< http://www.cesca.centers.vt.edu/research/references/uwb/sensor_staticlocation/adhoc_positioning.pdf>>, In IEEE Globecom, Dec. 2001,pp. 2926-2931.
Niculescu, et al., "Ad-Hoc Positioning System (APS) Using AOA", Retrieved at << http://www.google.co.in/url?sa~t&source~web&cd~2&ved~OCB4QFjAB&url~http%3A %2F%2Fciteseerx.ist.psu.edu%2Fviewdoc%2Fdownload%3Fdoi%3DI0.I.I.13.2982%26rep%3Drep 1 %26type%3Opdf&rct~j&q~Adhoc+position+system&ei~jxwbTP64J4nwOgTjw-mVCQ&usg~AFQjCNHT5FIHzUFRmWsKzU7skIcgkwX6Bg >>, InInfocom, Apr. 1-3, 2003, pp. 10.
Chinese 1st Office Action in Application 201380063737.1, mailed Jul. 5, 2016, 9 pgs.
Chinese 1st Office Action in Application 201280027553.5, mailed May 5, 2016, 12pgs.
U.S. Appl. No. 13/154,220, Amendment and Response filed Aug. 15, 2016, 17 pgs.
U.S. Appl. No. 13/154,220, Office Action mailed Dec. 1, 2016, 27 pages.

* cited by examiner

LOCATING POSITION WITHIN ENCLOSURE

BACKGROUND

Many devices provide location-based services that utilize position tracking. In one example, a mapping service on a mobile phone may utilize global coordinates (e.g., positional information, such as longitude and latitude, from a global positioning system (GPS)) to identify a current location of the mobile phone. In this way, the user may plan a travel route from the current location to a particular destination of interest to the user. In another example, a restaurant application on a tablet device may utilize positional information, such as global coordinates, to suggest local restaurants to a user. Current position tracking techniques utilize global coordinates associated with GPS because GPS may provide relatively accurate longitude and latitude information for outdoor spaces. However, GPS may not accurately represent indoor locations because GPS may not be able to identify locations within enclosures, such as buildings. In this way, location-based services may be limited to tracking outdoor positions.

SUMMARY

This summary is provided to introduce a selection of concepts in a simplified form that are further described below in the detailed description. This Summary is not intended to identify key factors or essential features of the claimed subject matter, nor is it intended to be used to limit the scope of the claimed subject matter.

Figure 3:
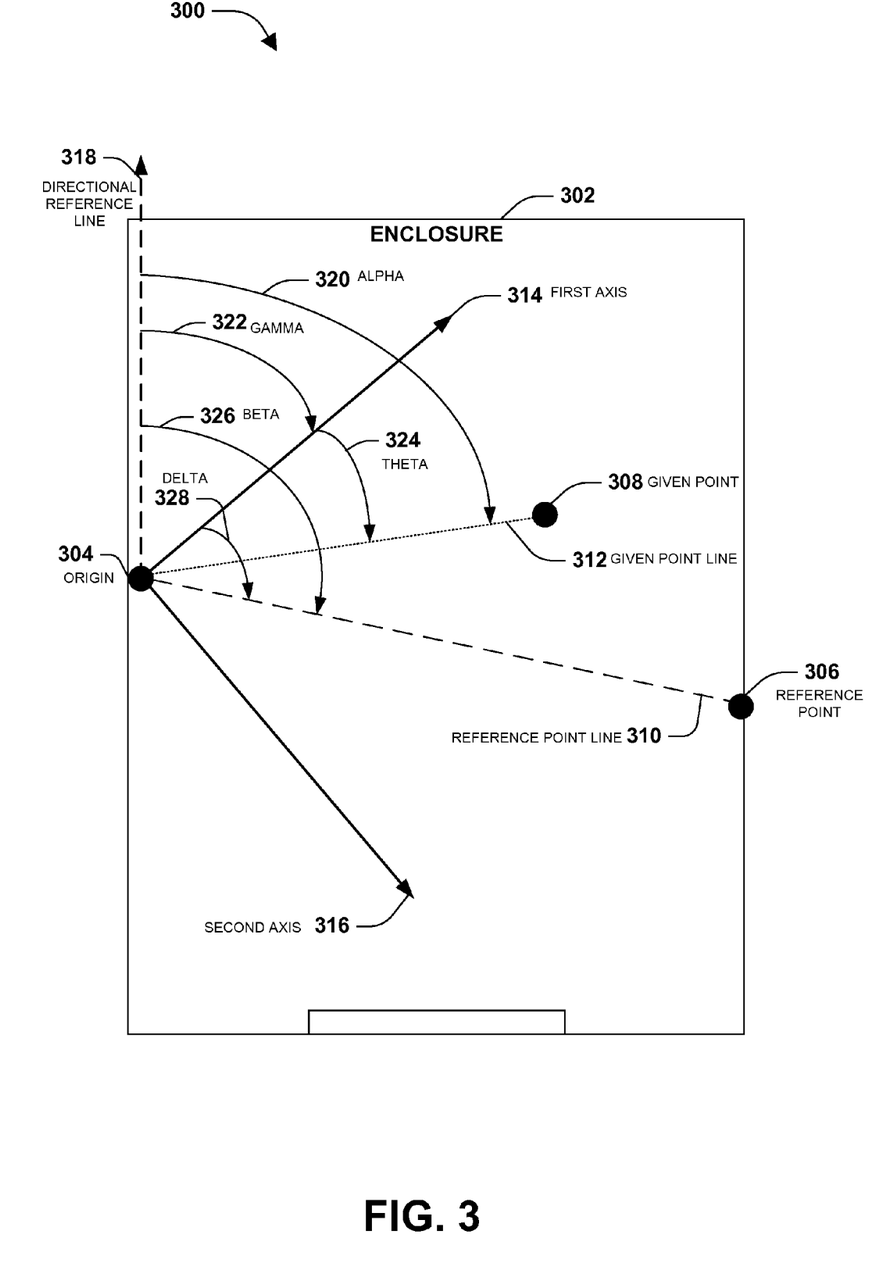
FIG. 3 is an illustration of an example of a representation of an enclosure.

Among other things, one or more systems and/or techniques for locating a position within an enclosure are provided herein. That is, a position (e.g., a location of an object, such as a mobile device, a person, an entity, a portion of a building, etc.) may be located within an enclosure (e.g., an underground structure, a subway, a floor of a building, etc.), such that the position may be tracked within indoor spaces without losing location-based functionality. In this way, a user of a mobile device may seamlessly transition between indoor and outdoor spaces, for example. It may be appreciated that an example of various angles, lines, points, and/or other features described in the summary are illustrated in FIG. 3 for illustrative purposes.

In one example of locating a position within an enclosure, local coordinates associated with the enclosure may be used to determine global coordinates of a given point as the position within the enclosure. That is, an origin point for a local coordinate system (e.g., a first position within a building, such as a corner of the building, may represent an origin of a Cartesian coordinate system associated with the building) may be established based upon origin point global coordinates of a global coordinate system for the origin point. For example, a GPS device, associated with the corner of a building, may provide the origin global coordinates of the origin point. A reference point in the local coordinate system (e.g., a second position within the building, such as a second corner of the building, may correspond to a location of the reference point within the building) may be established based upon reference point global coordinates of the global coordinate system for the reference point. For example, a GPS device, associated with the second corner of the building, may provide the reference point global coordinates of the reference point.

A directional reference line (e.g., true north) may be established for the enclosure based upon the global coordinate system. A first axis (e.g., a y axis) for the local coordinate system may be established based upon the origin point. In this way, an azimuth gamma (e.g., an angle from the directional reference line to the first axis) of the local coordinate system may be determined based upon the origin point and/or the reference point. For example, an azimuth beta (e.g., an angle from the directional reference line to a reference point line that connects the origin point to the reference point) and an angle delta (e.g., an angle from the first axis to the reference point line) may be used to determine the azimuth gamma. In this way, the azimuth gamma may be determined. An azimuth alpha (e.g., an angle from the directional reference line to a given point line that connects the origin point to the given point within the enclosure) may be determined. For example, an angle theta (e.g., an angle from the first axis to the given point line) and the azimuth gamma may be used to determine the azimuth alpha. Accordingly, given point global coordinates of the global coordinate system may be determined for the given point as the position within the enclosure. The given point global coordinates may be determined based upon the azimuth alpha, the origin point global coordinates, and/or a given point line length of the given point line, for example. In this way, local coordinates associated with the enclosure may be used to determine global coordinates of the position of the given point within the enclosure.

In another example of locating a position within an enclosure, global coordinates associated with the enclosure may be used to determine local coordinates of a given point as the position within the enclosure. That is, origin point global coordinates of a global coordinate system (e.g., coordinates obtained from GPS) and/or origin point local coordinates of a local coordinate system may be obtained for an origin point associated with the enclosure (e.g., an origin, corresponding to a first position within a building, for the local coordinate system associated with the building). Reference point global coordinates of the global coordinate system (e.g., coordinates obtained from GPS) and/or reference point local coordinates of the local coordinate system may be obtained for a reference point associated with the enclosure (e.g., a point at a second position within the building).

A directional reference line (e.g., true north) may be established for the enclosure based upon the global coordinate system. A first axis (e.g., a y axis) for the local coordinate system may be established based upon the origin point. In this way, an azimuth gamma (e.g., an angle from the directional reference line to the first axis) of the local coordinate system may be determined based upon the origin point and/or the reference point. An azimuth alpha (e.g., an angle from the directional reference line to a given point line that connects the origin point to the given point within the enclosure) may be determined. A given point line length of the given point line, that connects the origin point to the given point, may be determined. An angle theta (e.g., an angle from the first axis to the given point line) may be determined based upon the azimuth gamma and/or the azimuth alpha. Accordingly, given point local coordinates of the local coordinate system may be determined for the given point as the position within the enclosure. The given point local coordinates may be determined based upon the angle theta and/or the given point line length. In this way, global coordinates associated with the enclosure may be used to determine local coordinates of the position of the given point within the enclosure.

In another example of locating a position within an enclosure, a blueprint image of an enclosure may be used to determine coordinate points of a position (e.g., a position corresponding to a mobile device) within the enclosure. That is, the blueprint image of a level of the enclosure may be obtained (e.g., a blueprint image comprising pixels that represent a floor of a building). Because the blueprint image may represent the level using pixels, a set of scale parameters for the blueprint image may be used to convert between pixel values and physical coordinates. The set of scale parameters may map pixels of the blueprint image to physical coordinate measurements of the enclosure. A first perpendicular distance from the position within the enclosure to a first structure may be determined (e.g., a first distance from the mobile device to a first wall of the building). A second perpendicular distance from the position to a second structure may be determined (e.g., a second distance from the mobile device to a second wall of the building). In this way, a first circle may be generated based upon the first perpendicular distance using the set of scale parameters (e.g., the first circle may be generated using the first perpendicular distance as a radius), and a second circle may be generated based upon the second perpendicular distance using the set of scale parameters (e.g., the second circle may be generated using the second perpendicular distance as a radius).

The position of the first circle and/or the second circle may be translated within the blueprint image, such that the first circle and the second circle are tangential to the first structure and the second structure. For example, a first location for the first circle may be defined, such that the first circle is tangential to the first structure (e.g., the first circle may be moved to the first location within the blueprint image, such that the first circle is tangential to the first wall of the building). A second location for the second circle may be defined, such that the second circle is tangential to the second structure (e.g., the second circle may be moved to the second location within the blueprint image, such that the second circle is tangential to the second wall of the building). In this way, coordinate points of the position within the enclosure may be determined based upon coordinates of the first circle and/or coordinates of the second circle (e.g., based upon center values of the first circle and/or second circle).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

Many devices provide location-based services that utilize position tracking functionality, such as GPS, that do not provide relatively accurate tracking of positions within enclosures (e.g., building, a multi-level building, a shopping mall, a tunnel, a subway, etc. (e.g., where a GPS signal may be unavailable, blocked, etc.)). Accordingly, as provided herein, a position (e.g., a position of an object, such as a mobile device) may be located within an enclosure, such that a location of the position may be track within an indoor space. For example, a global spatial model may be used to represent locations (e.g., three dimensional locations) of objects utilizing known global coordinates (e.g., GPS receivers mounted on a corner of a building) and/or local coordinates of a local coordinate system associated with the enclosure (e.g., a Cartesian coordinate system). The global spatial model may transform between global coordinates and local coordinates in order to identify the position within the enclosure. In one example, the global spatial model may utilize a blueprint image of the enclosure in order to determine the position within the enclosure. In this way, location tracking may be provided within indoor spaces, and location tracking may be seamlessly transitioned between indoor and outdoor spaces.

Figure 1:
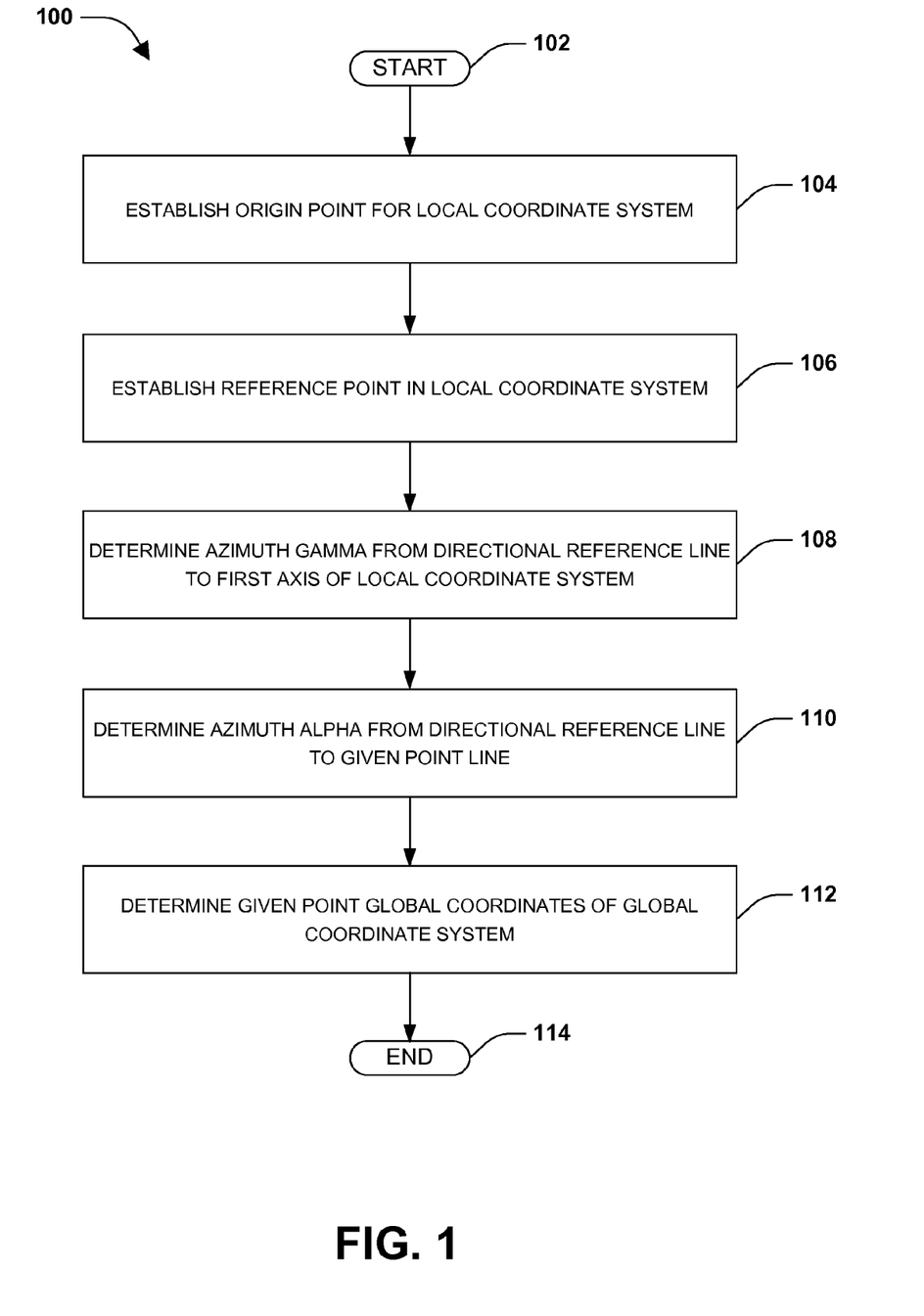
FIG. 1 is a flow diagram illustrating an exemplary method of locating a position within an enclosure.

One embodiment of locating a position within an enclosure is illustrated by exemplary method 100 in FIG. 1. It may be appreciated that method 100 may be described in conjunction with example 300 of FIG. 3 for illustrative purposes (e.g., example 300 comprises a representation of an enclosure 302, such as a floor of a building comprising a first GPS device located at an origin point 304 and/or a second GPS device located at a reference point 306 within the enclosure 302). The position within the enclosure may correspond to a position of a given point 308 within the enclosure 302.

At 102, the method starts. At 104, the origin point 304 for a local coordinate system (e.g., a Cartesian coordinate system comprising a first axis 314 and a second axis 316) associated with the enclosure 302 may be established based upon origin point global coordinates of a global coordinate system for the origin point 304 (e.g., the first GPS device located at the origin point 304 may provide the origin point global coordinates). At 106, the reference point 306 may be established in the local coordinate system based upon reference point global coordinates of the global coordinate system for the reference point 306 (e.g., the second GPS device located at the reference point 306 may provide the reference point global coordinates).

A directional reference line 318 may be identified within the enclosure 302 (e.g., the first GPS device may provide a true north measurement that may be used to construct the directional reference line 318). At 108, an azimuth gamma 322 (e.g., an angle between the directional reference line 318 and the first axis 314) may be determined based upon the origin 304 and/or the reference point 306. In one example of determining the azimuth gamma 322, an azimuth beta 326 (e.g., an angle from the directional reference line 318 to a reference point line 310 that connects the origin point 304 to the reference point 306) may be determined based upon the origin point 304, the reference point 306, and/or a reference point line length of the reference point line 310. For example, an inverse geodetic problem solution (e.g., an inverse chord equation) may be used to determine the azimuth beta 326. An angle delta 328 from the first axis 314 to the reference point line 310 may be determined. In this way, the azimuth gamma 322 may be determined based upon the azimuth beta 326 and/or the angle delta 328 (e.g., azimuth gamma 322 equals azimuth beta 326 minus angle delta 328).

At 110, an azimuth alpha 320 (e.g., an angle from the directional reference line 318 to a given point line 312 that connects the origin point 304 to the given point 308) may be determined. In one example of determining the azimuth alpha 320, an angle theta 324 (e.g., an angle between the first axis 314 and the given point line 312) may be determined based upon given point local coordinates of the local coordinate system for the given point 308. In this way, the azimuth alpha 320 may be determined based upon the angle theta 324 and/or the azimuth gamma 322.

At 112, given point global coordinates (e.g., GPS coordinates of the given point 308, such as latitude and longitude values) of the global coordinate system may be determined for the given point 308 as the position within the enclosure. The given point global coordinates may be determined based upon the azimuth alpha 320, and/or a given point line length of the given point line 312 (e.g., a distance from the origin 304 to the given point 308). For example, a direct geodetic problem solution may be used to determine the given point global coordinates. In this way, global coordinates, such as GPS coordinates, may be determined for the given point 308 based upon local coordinates of the given point 308 (e.g., the given point local coordinates used to determine the azimuth alpha 320). In one example, the given point 308 may correspond to an object, such as a mobile device. The position of the object may be displayed within a digital representation of the enclosure 302 through a user interface (e.g., a mapping application) on the mobile device and/or on another device, etc., for example. In this way, the mobile device may be tracked inside the enclosure 302 (e.g., by translating local coordinates to global coordinates, such as GPS coordinates). It may be appreciated that the given point 308 may correspond to any object, such as a wireless access point, a person, a location tracking enabled device, etc.). At 114, the method ends.

Figure 2:
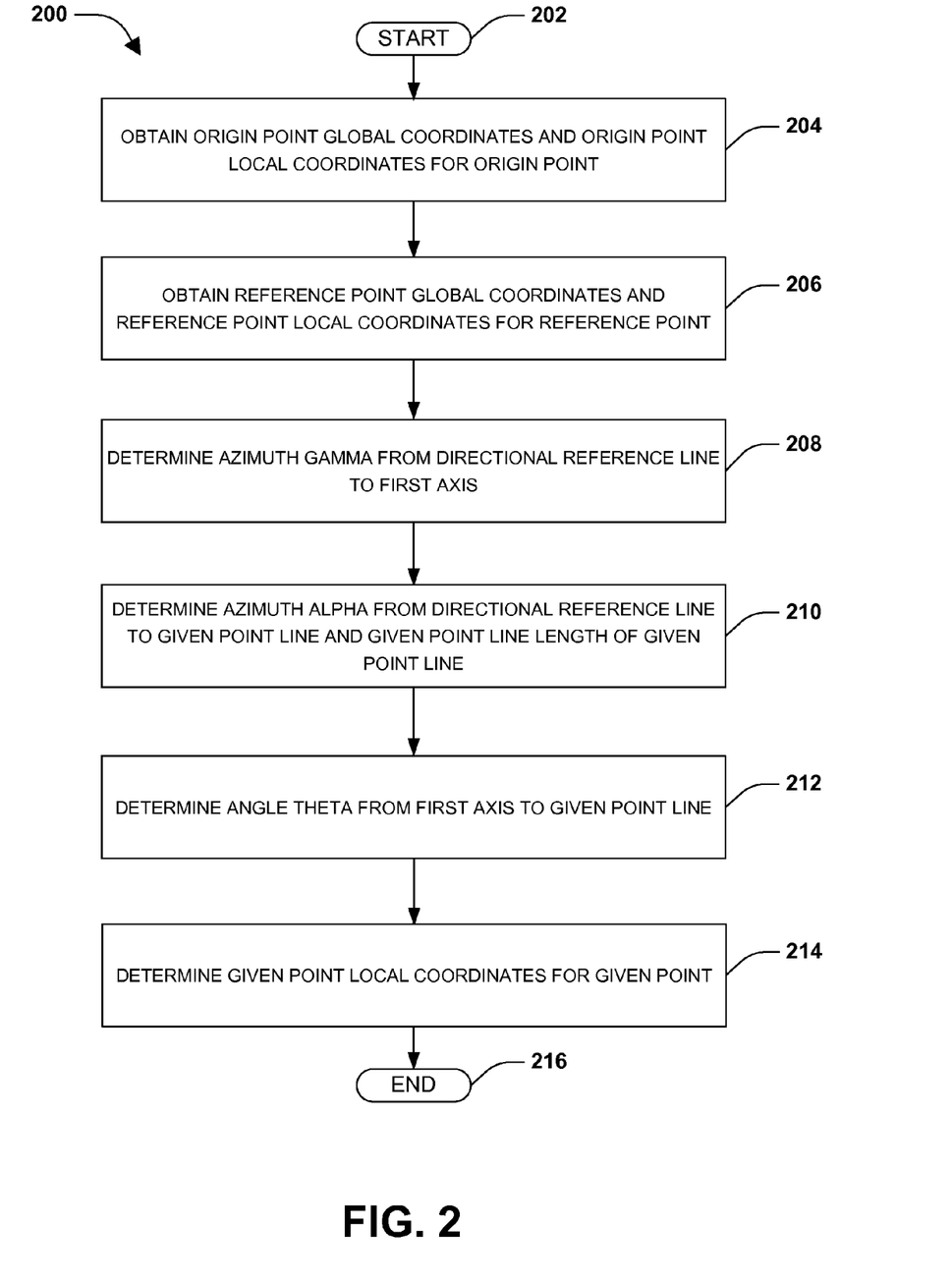
FIG. 2 is a flow diagram illustrating an exemplary method of locating a position within an enclosure.

One embodiment of locating a position within an enclosure is illustrated by exemplary method 200 in FIG. 2. It may be appreciated that method 200 may be described in conjunction with example 300 of FIG. 3 for illustrative purposes (e.g., example 300 comprises a representation of an enclosure 302, such as a floor of a building comprising a first GPS device located at an origin point 304 and/or a second GPS device located at a reference point 306 within the enclosure 302). The position within the enclosure may correspond to a position of a given point 308 within the enclosure 302.

At 202, the method starts. At 204, origin point global coordinates of a global coordinate system (e.g., the first GPS device located at the origin point 304 may provide the origin point global coordinates) and origin point local coordinates of a local coordinate system (e.g., a Cartesian coordinate system comprising a first axis 314 and a second axis 316) may be obtained for the origin point 304. At 206, reference point global coordinates of the global coordinate system (e.g., the second GPS device located at the reference point 306 may provide the reference point global coordinates) and reference point local coordinates of the local coordinate system may be obtained for the reference point 306.

A directional reference line 318 may be identified within the enclosure 302 (e.g., the first GPS device may provide a true north measurement that may be used to construct the directional reference line 318). At 208, an azimuth gamma 322 (e.g., an angle from the directional reference line 318 to the first axis 314 of the local coordinate system) may be determined based upon the origin point 304 and/or the reference point 306. In one example, given point global coordinates of the global coordinate system may be obtained, which may be used to determine one or more angles, such as an azimuth alpha 320 (e.g., the given point global coordinates may be used to identify a given point line length of the given point line 312, which may be used to determine the azimuth alpha 320). Accordingly, at 210, the azimuth alpha 320 (e.g., an angle from the directional reference line 318 to the given point line 312 connecting the origin point 304 and the given point 308) and the length of given point line 312 may be determined. For example, an inverse geodetic problem solution (e.g., an inverse chord equation) may be used to determine the azimuth alpha 320 and length of given point line 312.

At 212, an angle theta 324 from the first axis 314 to the given point line 312 may be determined based upon the azimuth gamma 322 and/or the azimuth alpha 320 (e.g., angle theta 324 equals azimuth alpha 320 minus azimuth gamma 322).

At 214, given point local coordinates of the local coordinate system (e.g., x/y coordinates) may be determined for the given point 308 as the position within the enclosure 302. The given point local coordinates may be determined based upon the angle theta and/or the given point line length of the given point line 312. In this way, local coordinates, such as x/y coordinates, may be determined for the given point 308 based upon global coordinates associated with the enclosure 302, for example. At 216, the method ends.

Figure 4:
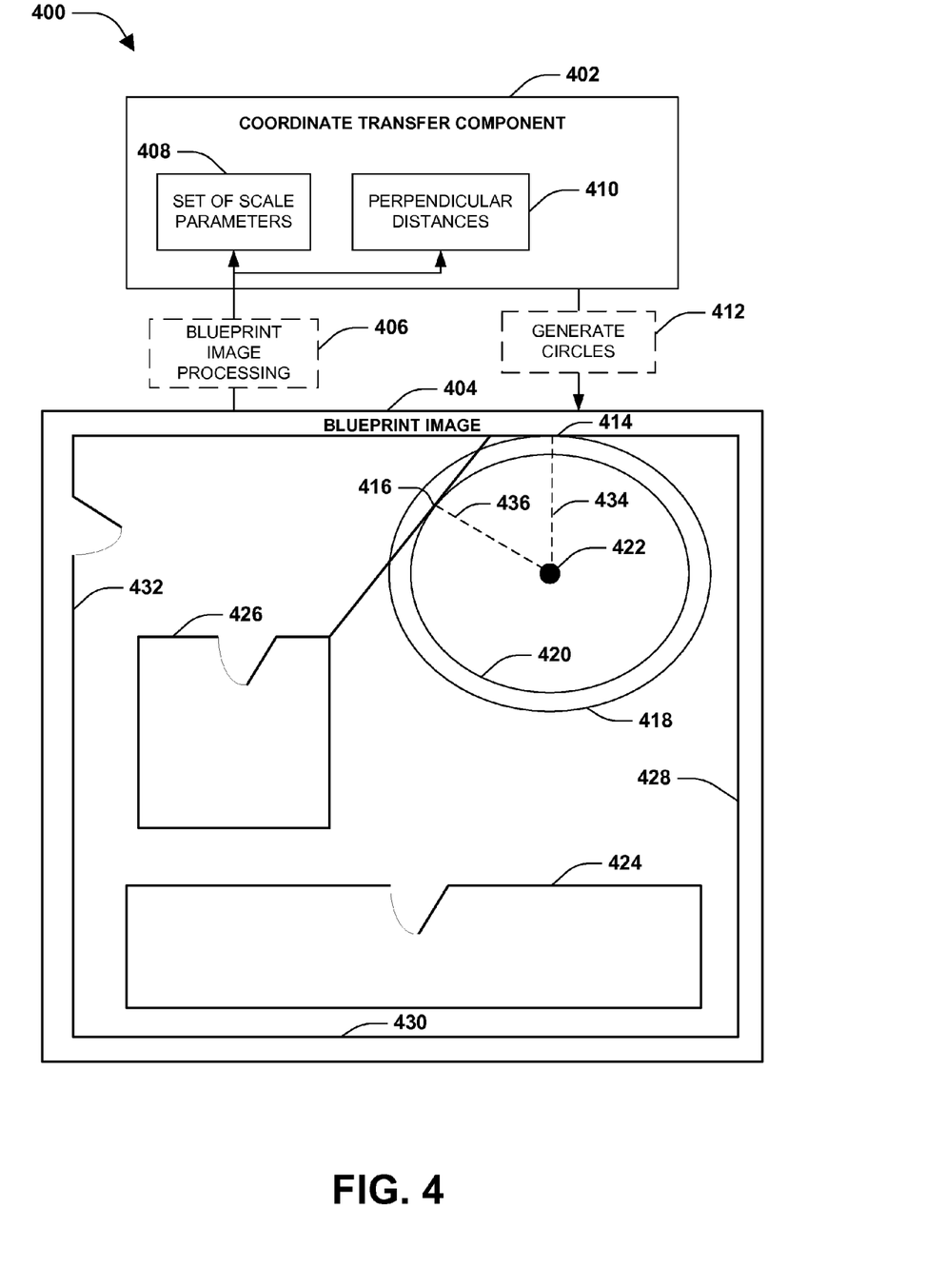
FIG. 4 is a component block diagram illustrating an exemplary system for generating one or more circles used for locating a position within an enclosure.

FIG. 4 illustrates an example of a system 400 configured for generating one or more circles used for locating a position within an enclosure. The system 400 may comprise a coordinate transfer component 402. The coordinate transfer component 402 may be configured to obtain a blueprint image 404 (e.g., blueprint image processing 406) of a level of an enclosure (e.g., a floor of a building). The blueprint image 404 may comprise one or more pixels that represent the enclosure (e.g., a first room 426, a second room 424, a first wall 414, a second wall 416, a third wall 428, a fourth wall 430, a fifth wall 432, and/or other structures.

The coordinate transfer component 402 may be configured to determine a set of scale parameters 408 for the blueprint image 404. Because the blueprint image 404 represents the enclosure as pixels, the set of scale parameters 408 may comprise mappings of pixels to physical coordinate measurements of the enclosure. In this way, the set of scale parameters 408 may be used by the coordinate transfer component 402 to switch between pixel values and physical coordinates of the enclosure.

The coordinate transfer component 402 may be configured to determine a first perpendicular distance 434 from a position 422 within the enclosure to a first structure (e.g., the first wall 414), and a second perpendicular distance 436 from the position 422 to a second structure (e.g., the second wall 416). In this way, the coordinate transfer component 402 may create perpendicular distances 410. In one example, the first perpendicular distance 434 and/or the second perpendicular distance 436 may be received through a mapping user interface (e.g., a user of a mobile device, corresponding to position 422, may utilize the mobile device to detect and/or input the perpendicular distances).

The coordinate transfer component 402 may be configured to generate a first circle 418 based upon the first perpendicular distance 434 using the set of scale parameters 408. For example, a first radius may be defined for the first circle 418 based upon the first perpendicular distance 434. The set of scale parameters 408 may be used to transform pixel values to physical coordinates when generating the first circle 418. The coordinate transfer component 402 may be configured to generate a second circle 420 based upon the second perpendicular distance 436 using the set of scale parameters 408. For example, a second radius may be defined for the second circle 420 based upon the second perpendicular distance 436. The set of scale parameters 408 may be used to transform pixel values to physical coordinates when generating the second circle 420. In this way, the coordinate transfer component 402 may be configured to generate 412 the first circle 418 and/or the second circle 420, which may be used to locate a position (e.g., local coordinates of a local coordinate system for the position 422) within the enclosure represented by the blueprint image 404 (e.g., as illustrated in FIG. 5).

Figure 5:
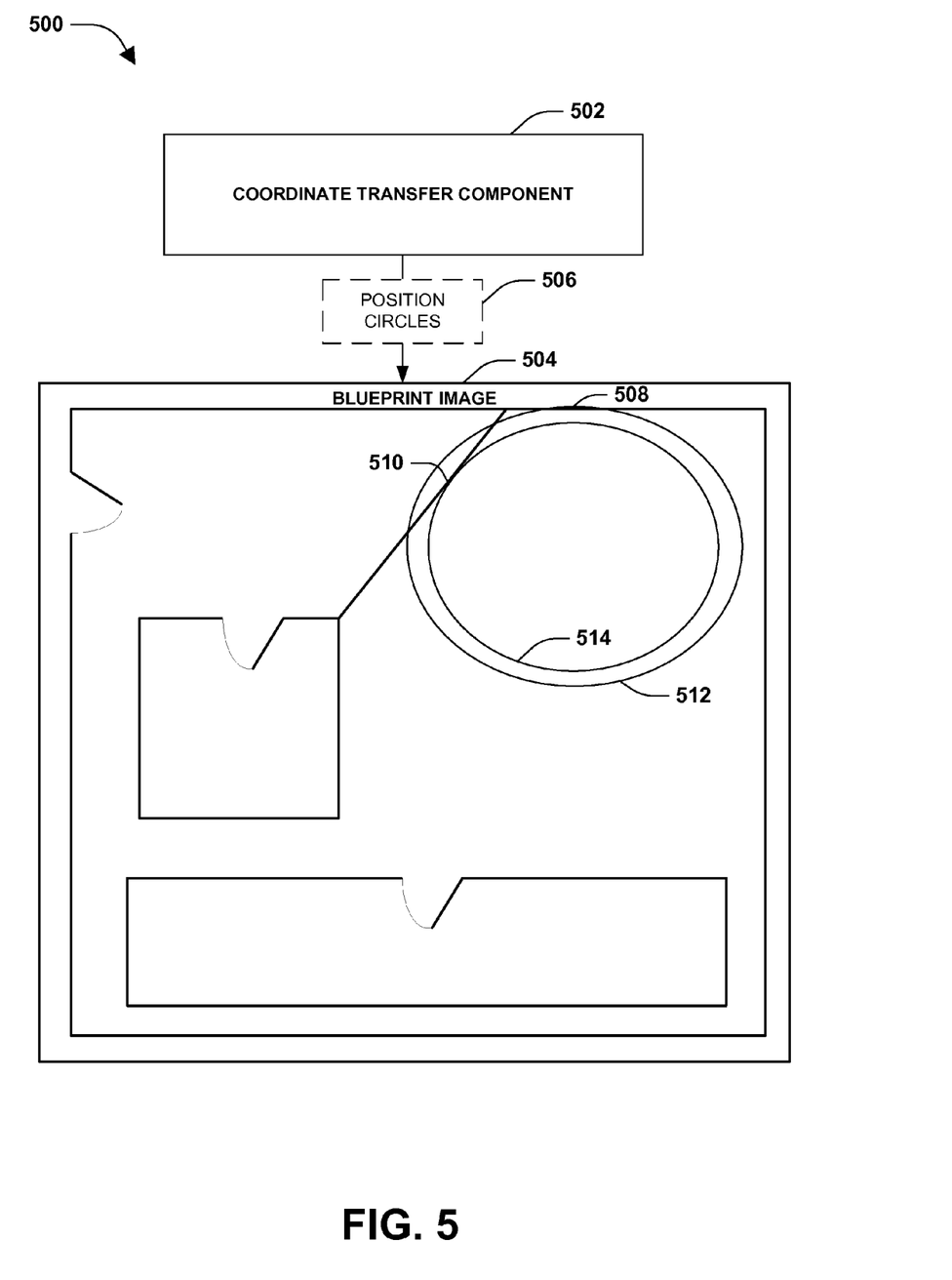
FIG. 5 is a component block diagram illustrating an exemplary system for locating a position within an enclosure.

FIG. 5 illustrates an example of a system 500 configured for locating a position within an enclosure. It may be appreciated that in one example, a blueprint image 504 may corresponds to the blueprint image 404 of FIG. 4 (e.g., a coordinate transfer component 402 may have generated a first circle 418, corresponding to a first circle 512, and/or a second circle 420, corresponding to a second circle 514). The system 500 may comprise a coordinate transfer component 502. The coordinate transfer component 502 may have obtained access to the blueprint image 504 and/or may have generated the first circle 512 and/or the second circle 514 within the blueprint image 504.

The coordinate transfer component 502 may be configured to position 506 the first circle 512 and/or the second circle 514 within the blueprint image 504. For example, the coordinate transfer component 502 may define a first location for the first circle 512, such that the first circle 512 is tangential to a first structure (e.g., a first wall 508). The coordinate transfer component 502 may define a second location for the second circle 514, such that the second circle 514 is tangential to a second structure (e.g., the second wall 510). In this way, the coordinate transfer component 502 may determine coordinates points of a position (e.g., local coordinates of a local coordinate system for position 422 of FIG. 4) within the enclosure based upon coordinates of the first circle 512 and/or coordinates of the second circle 514 (e.g., pixel coordinates or local coordinates of a local coordinate system for the position). For example, the coordinate points may be based upon center values of the first circle 512 and/or the second circle 514. In one example, the coordinate transfer component 502 may display the coordinate points through a mapping user interface. It may be appreciated that the position may correspond to a floor of a building, such that the coordinate points may correspond to three-dimensional coordinates. In this way, the position may be tracked between floors of the building and/or between an outdoor space and the building, for example.

Figure 6:
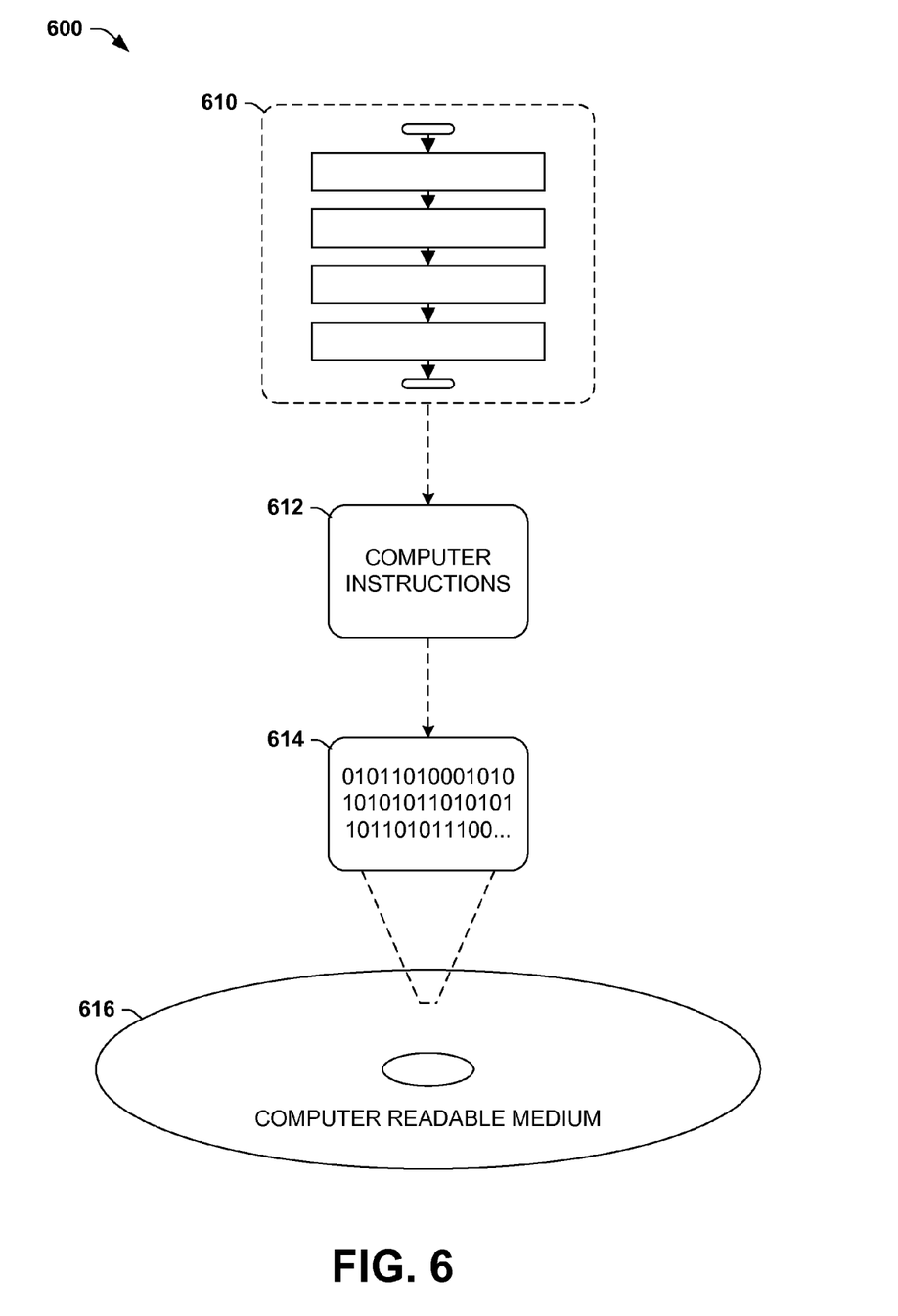
FIG. 6 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 6, wherein the implementation 600 comprises a computer-readable medium 616 (e.g., a CD-R, DVD-R, or a platter of a hard disk drive), on which is encoded computer-readable data 614. This computer-readable data 614 in turn comprises a set of computer instructions 612 configured to operate according to one or more of the principles set forth herein. In one such embodiment 600, the processor-executable computer instructions 612 may be configured to perform a method 610, such as at least some of the exemplary method 100 of FIG. 1 and/or at least some of exemplary method 200 of FIG. 2, for example. In another such embodiment, the processor-executable instructions 612 may be configured to implement a system, such as, at least some of the exemplary system 400 of FIG. 4 and/or at least some of the exemplary system 500 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 7:
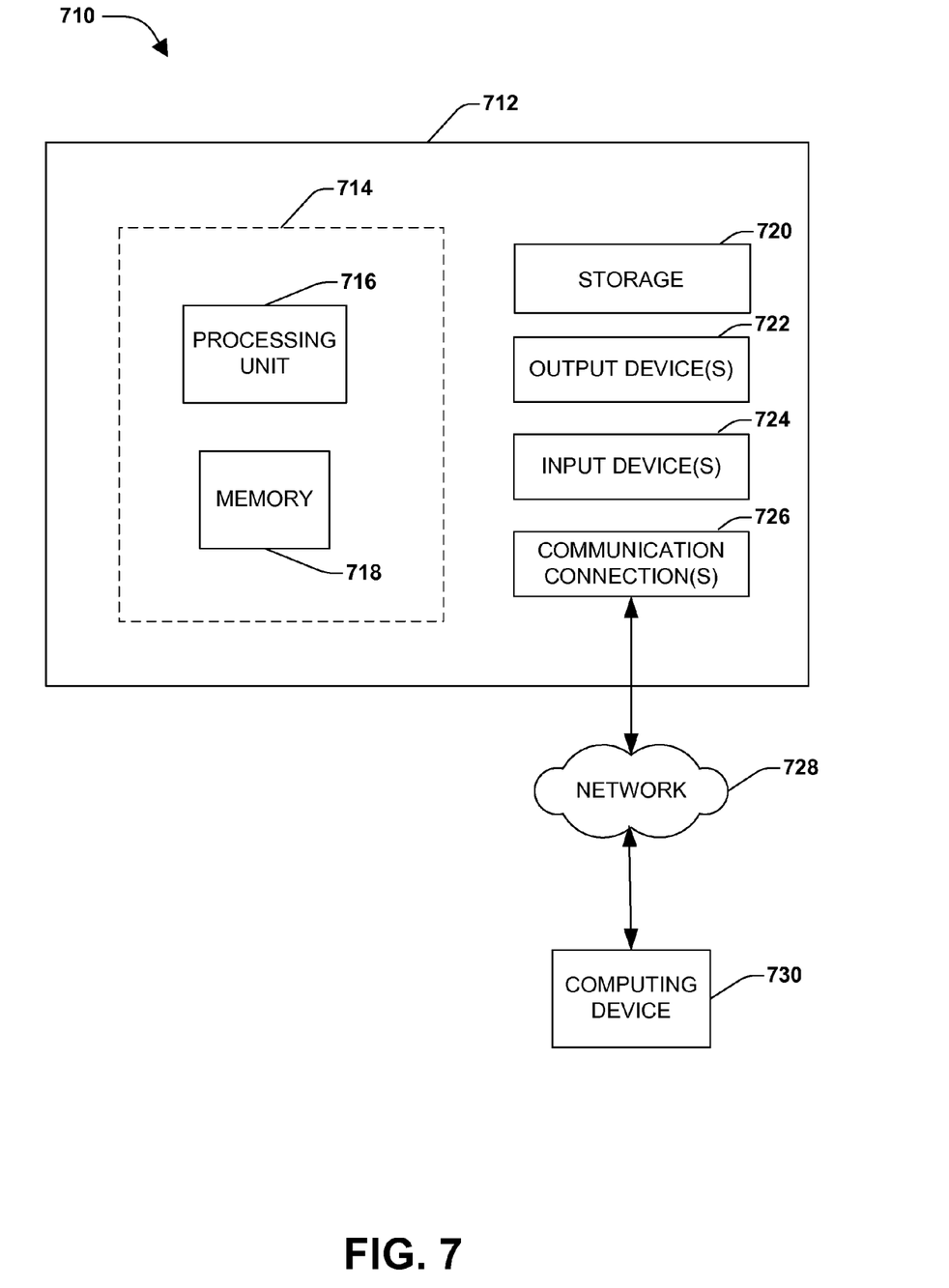
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 710 comprising a computing device 712 configured to implement one or more embodiments provided herein. In one configuration, computing device 712 includes at least one processing unit 716 and memory 718. Depending on the exact configuration and type of computing device, memory 718 may be volatile (such as RAM, for example), non-volatile (such as ROM, flash memory, etc., for example) or some combination of the two. This configuration is illustrated in FIG. 7 by dashed line 714.

In other embodiments, device 712 may include additional features and/or functionality. For example, device 712 may also include additional storage (e.g., removable and/or non-removable) including, but not limited to, magnetic storage, optical storage, and the like. Such additional storage is illustrated in FIG. 7 by storage 720. In one embodiment, computer readable instructions to implement one or more embodiments provided herein may be in storage 720. Storage 720 may also store other computer readable instructions to implement an operating system, an application program, and the like. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 712. Any such computer storage media may be part of device 712.

Device 712 may also include communication connection(s) 726 that allows device 712 to communicate with other devices. Communication connection(s) 726 may include, but is not limited to, a modem, a Network Interface Card (NIC), an integrated network interface, a radio frequency transmitter/receiver, an infrared port, a USB connection, or other interfaces for connecting computing device 712 to other computing devices. Communication connection(s) 726 may include a wired connection or a wireless connection. Communication connection(s) 726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 712 may include input device(s) 724 such as keyboard, mouse, pen, voice input device, touch input device, infrared cameras, video input devices, and/or any other input device. Output device(s) 722 such as one or more displays, speakers, printers, and/or any other output device may also be included in device 712. Input device(s) 724 and output device(s) 722 may be connected to device 712 via a wired connection, wireless connection, or any combination thereof. In one embodiment, an input device or an output device from another computing device may be used as input device(s) 724 or output device(s) 722 for computing device 712.

Components of computing device 712 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 712 may be interconnected by a network. For example, memory 718 may be comprised of multiple physical memory units located in different physical locations interconnected by a network.

Those skilled in the art will realize that storage devices utilized to store computer readable instructions may be distributed across a network. For example, a computing device 730 accessible via a network 728 may store computer readable instructions to implement one or more embodiments provided herein. Computing device 712 may access computing device 730 and download a part or all of the computer readable instructions for execution. Alternatively, computing device 712 may download pieces of the computer readable instructions, as needed, or some instructions may be executed at computing device 712 and some at computing device 730.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an"

as used in this application and the appended claims may generally be construed to mean "one or more" unless specified otherwise or clear from context to be directed to a singular form. Also, at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer implemented method, comprising:
   obtaining, from a first global positioning system (GPS) device, origin point global coordinates of a global coordinate system for an origin point associated with a physical enclosure;
   obtaining, from a second GPS device, reference point global coordinates of the global coordinate system for a reference point associated with the physical enclosure, the reference point different than the origin point;
   determining a first axis of a local coordinate system associated with the physical enclosure, the first axis extending from the origin point;
   determining an azimuth gamma from a directional reference line to the first axis, the directional reference line extending in a known direction from the origin point at the origin point global coordinates, the determining an azimuth gamma comprising:
      determining an azimuth beta from the directional reference line to a reference point line connecting the origin point at the origin point global coordinates to the reference point at the reference point global coordinates based upon the origin point and the reference point;
      determining an angle delta from the first axis to the reference point line; and
      determining the azimuth gamma based upon the azimuth beta and the angle delta;
   determining an azimuth alpha from the directional reference line to a given point line connecting the origin point at the origin point global coordinates to a given point within the physical enclosure, the determining an azimuth alpha comprising:
      determining an angle theta between the first axis and the given point line based upon given point local coordinates of the local coordinate system for the given point; and
      determining the azimuth alpha based upon the angle theta and the azimuth gamma;
   determining given point global coordinates of the global coordinate system for the given point based upon the azimuth alpha and a given point line length of the given point line; and
   determining a physical position of an object within the physical enclosure based upon the given point global coordinates of the global coordinate system; and displaying, through a user interface on a mobile device, the object at the physical position within a digital representation of the physical enclosure.

2. The method of claim 1, the physical enclosure comprising a building and the physical position corresponding to a location within the building.

3. The method of claim 1, the given point line disposed between the directional reference line and the reference point line.

4. The method of claim 1, the first axis disposed between the directional reference line and the given point line.

5. The method of claim 1, the determining an azimuth beta comprising:
   utilizing an inverse geodetic problem solution to determine the azimuth beta.

6. The method of claim 1, the determining given point global coordinates comprising:
   utilizing a direct geodetic problem solution to determine the given point global coordinates.

7. A computer readable device comprising instructions that when executed perform operations comprising:
   obtaining, from a first global positioning system (GPS) device, origin point global coordinates of a global coordinate system for an origin point associated with a physical enclosure;
   obtaining, from a second GPS device, reference point global coordinates of the global coordinate system for a reference point associated with the physical enclosure, the reference point different than the origin point;
   determining a first axis of a local coordinate system associated with the physical enclosure, the first axis extending from the origin point;
   determining an azimuth gamma from a directional reference line to the first axis, the directional reference line extending in a known direction from the origin point at the origin point global coordinates, the determining an azimuth gamma comprising:
      determining an azimuth beta from the directional reference line to a reference point line connecting the origin point at the origin point global coordinates to the reference point at the reference point global coordinates based upon the origin point and the reference point;
      determining an angle delta from the first axis to the reference point line; and
      determining the azimuth gamma based upon the azimuth beta and the angle delta;
   determining an azimuth alpha from the directional reference line to a given point line connecting the origin point at the origin point global coordinates to a given point within the physical enclosure;
   determining an angle theta between the first axis and the given point line based upon the azimuth gamma and the azimuth alpha;
   determining given point global coordinates of the global coordinate system for the given point based upon the angle theta and a given point line length of the given point line; and displaying, through a user interface on a mobile device, an object at a physical position within a digital representation of the physical enclosure based upon the given point global coordinates of the global coordinate system.

8. The computer readable device of claim 7, the determining an azimuth alpha comprising:
utilizing an inverse geodetic problem solution to determine the azimuth alpha.

9. The computer readable device of claim 8, the inverse geodetic problem solution comprising an inverse chord equation.

10. The computer readable device of claim 7, the first axis disposed between the directional reference line and the given point line.

11. The computer readable device of claim 7, the physical enclosure comprising a building, the origin point corresponding to a first portion of the building, and the reference point corresponding to a second portion of the building.

12. The computer readable device of claim 7, the given point corresponding to a wireless communication access point.

13. A system, comprising:
one or more processing units; and
memory comprising instructions that when executed by at least one of the one or more processing units perform operations comprising:
obtaining, from a first global positioning system (GPS) device, origin point global coordinates of a global coordinate system for an origin point associated with a physical enclosure;
obtaining, from a second GPS device, reference point global coordinates of the global coordinate system for a reference point associated with the physical enclosure, the reference point different than the origin point;
determining a first axis of a local coordinate system associated with the physical enclosure, the first axis extending from the origin point;
determining an azimuth gamma from a directional reference line to the first axis, the determining an azimuth gamma comprising:
determining an azimuth beta from the directional reference line to a reference point line connecting the origin point at the origin point global coordinates to the reference point at the reference point global coordinates based upon the origin point and the reference point;
determining an angle delta from the first axis to the reference point line; and
determining the azimuth gamma based upon the azimuth beta and the angle delta;
determining given point global coordinates of the global coordinate system for a given point based upon the azimuth gamma; and
determining a physical position of an object within the physical enclosure based upon the given point global coordinates of the global coordinate system; and
displaying, through a user interface on a mobile device, the object at the physical position within a digital representation of the physical enclosure.

14. The system of claim 13, the determining given point global coordinates comprising:
determining the given point global coordinates based upon a given point line length of a given point line connecting the origin point to a given point.

15. The system of claim 13, the physical enclosure comprising a building and the physical position corresponding to a location within the building.

16. The system of claim 13, the given point corresponding to a wireless communication access point.

* * * * *